United States Patent Office 3,211,792
Patented Oct. 12, 1965

3,211,792
1-(PHENYL)- OR 1-(ALKYL-SUBSTITUTED-PHENYL)-5-(SUBSTITUTED-PHENYL)-3-AZA PENTA-(1)-OLS AND SALTS THEREOF
John Mervyn Osbond, Welwyn Garden City, and James Charles Wickens, St. Albans, Herts, England, assignors to Hoffmann-La Roche Inc., Nutley, N.J., a corporation of New Jersey
No Drawing. Filed Jan. 16, 1964, Ser. No. 338,003
Claims priority, application Great Britain, Jan. 24, 1963, 3,009/63
11 Claims. (Cl. 260—570.6)

This invention relates, in general, to novel aza-pentanols and to a process for the production thereof. More particularly, the invention relates to novel 1,5-disubstituted-3-aza-pentanol-(1) compounds, to acid addition salts thereof and to a process for producing same.

The novel aza-pentanol compounds of this invention have the formula

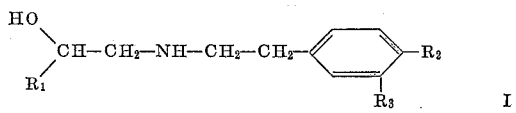

in which the symbol $R_1$ represents a phenyl, a 3-(lower alkyl)-phenyl, a 4-(lower alkyl)-phenyl or a 3,4-(dilower alkyl)-phenyl radical; in which the symbol $R_2$ represents a hydroxy, methoxy, ethoxy, or benzyloxy group; in which the symbol $R_3$ represents a hydroxy, methoxy, ethoxy or benzyloxy group; and in which $R_2$ and $R_3$, taken together, represent a methylenedioxy group.

As used in the preceding paragraph, the term "lower alkyl" refers to alkyl groups having up to 4 carbon atoms. Preferably, such lower alkyl groups are methyl and ethyl radicals. Moreover, in Formula I which is depicted in the preceding paragraph, the radicals which are represented by the symbols $R_2$ and $R_3$ may be the same or they may be different.

Furthermore, encompassed within the scope of this invention are salts of the compounds of Formula I with medicinally acceptable acids.

The novel 1,5-disubstituted-3-aza-pentanol-(1) compounds of this invention, including the acid addition salts thereof with medicinally acceptable acids, are useful as hypotensive agents.

The novel compounds of Formula I are readily produced. In one embodiment of the invention, the oxo group of a haloketone having the formula:

in which the symbol $R_1$ represents a phenyl, a 3-(lower alkyl)-phenyl, a 4-(lower alkyl)-phenyl or a 3,4-di-(lower alkyl)-phenyl radical; and in which the symbol X represents a halogen atom, is first reduced to a hydroxy group. Subsequently, the reduction product, that is, the $R_1$-substituted halohydrin, or, in the alternative, the 1-epoxyethyl compound which is obtained therefrom by dehydrohalogenation, is condensed with an amine having the formula:

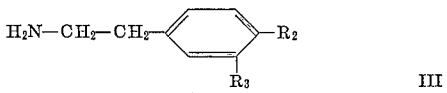

in which the symbol $R_2$ represents a protected hydroxy group or a methoxy or ethoxy group; in which the symbol $R_3$ represents a protected hydroxy group or a methoxy or ethoxy group; and in which $R_2$ and $R_3$, taken together, represent a methylene dioxy group.

The expression "protected hydroxy group" is used herein to denote an ether group, for example, a benzyloxy group, which is not cleaved when the amine is reacted with the halohydrin or halo-ketone reagents.

In an alternative preparative method, the halo-ketone of Formula II is condensed with the amine of Formula III, following which the oxo group of the condensation product is converted by catalytic reduction, into a hydroxy group. If necessary, any protected hydroxy group present in any compound produced by either of the foregoing procedures can be converted into a free hydroxy group by appropriate means. The bases which are produced by such processes can be transformed, if desired, into salts of a medicinally acceptable acid.

The halo-ketones of Formula II, which are used as the starting materials in the preparation of this invention, are prepared from appropriately substituted aromatic hydrocarbons and chloroacetyl chloride by means of a Friedel-Crafts reaction, using aluminum chloride as the catalyst.

In those embodiments of the invention where an amine of Formula III is used which has protected hydroxy groups present as the $R_2$ and/or $R_3$ substituent, the protecting group is preferably, a benzyloxy radical. However, other protecting groups which, like the benzyloxy group, are not influenced by the halohydrin or halo-ketone reagents, may instead be present.

Reduction of the halo-ketone of Formula II can be effected using aluminum isopropoxide in isopropanol at an elevated temperature. In the alternative reduction of the halo-ketone can be carried out using an alkali-metal borohydride, such as potassium borohydride, at temperatures below about room temperature.

The condensation of the amine of Formula III with the $R_1$-substituted halohydrin which is obtained when the halo-ketone of Formula II is reduced is advantageously carried out in the presence of a suitable condensing agent, preferably using a ratio of one mole of the amine for each mole of the $R_1$-substituted halohydrin reduction product. It has been found that sodium carbonate is particularly well suited for use as the condensing agent in this step of the process.

In the alternate preparative method, wherein the halo-ketone of Formula II is condensed with the amine of Formula III, the condensation reaction can be carried out by mixing, at a low temperature, a solution of the halo-ketone with a solution of the amine. Generally, this reaction is effected at a temperature of 0° C. or lower. Moreover, in this reaction it is preferred to use a ratio of two molar proportions of the amine component for each mole of halo-ketone. In the second step of this method, wherein the oxo group of the condensation product is converted by reduction to a hydroxy group, the reduction is effected conveniently in a solvent, using Raney-nickel as the catalyst, preferably at a temperature of about 20° C. and at atmospheric pressure.

The condensation of the $R_1$-substituted halohydrin with the amine of Formula III is believed to proceed by way of the formation of a 1-epoxyethyl compound. In fact, the condensation can be carried out, and preferably is carried out, by first dehydrohalogenating the halohydrin and condensing the product, thus obtained, with the amine of Formula III. This dehydrohalogenation step is conveniently carried out by treating a solution of the halohydrin in a lower alkanol with a lower alkanolic solution of an alkali metal hydroxide. It is preferred, however, to effect the dehydrohalogenation using a methanolic solution of potassium hydroxide.

The condensation of the epoxyethyl compound with the amine of Formula III is carried out, most conveniently, in the presence of a condensing agent. Suitable for use as the condensing agent are, for example, sodium hydroxide, sodium acetate. It is preferred, however, to use sodium hydroxide as the condensing agent and to effect the condensation at a temperature of about 20° C.

The compounds of Formula I can be converted, by conventional methods, into salts of medicinally acceptable inorganic acids and into salts of medicinally acceptable organic acids. Thus, for example, encompassed within the scope of this invention are salts of the compounds of Formula I with inorganic acids, such as, hydrochloric acid, hydrobromic acid, sulfuric acid, phosphoric acid and salts of the Formula I compounds with organic acids, such as, tartaric acid, citric acid.

As indicated heretofore the novel aza-pentanol compounds of Formula I possess valuable pharmacological properties. Specifically, these compounds are useful as hypotensive agents. These compounds can be used as medicaments, for example, in the form of suitable pharmaceutical preparations. These compounds, as well as acid addition salts thereof, can be used as such or, in the alternative, they can be used in admixture with other compounds. For example, the compounds of this invention can be mixed with inert adjuvants, either organic or inorganic in nature, such as, gelatin, lactose, starch, magnesium stearate, talc, vegetable oils, polyalkylene glycols, etc. These preparations can be provided in the form of tablets or they can be incorporated into suitable hard shell capsules. Additionally, these preparations may be provided in liquid form, for example, as solutions, emulsions or suspensions. Furthermore, if desired, these pharmaceutical preparations can be sterilized and/or mixed with adjuvant materials, such as, preservatives, stabilizers, wetting or emulsifying agents, salts for altering osmotic pressure, buffers. Moreover, the compounds of this invention can be present in such preparations in combination with other therapeutically active substances.

For a fuller understanding of the nature and objects of this invention, reference may be had to the following examples, which are given merely as further illustrations of the invention and are not to be construed in a limiting sense.

EXAMPLE 1

*Preparation of 1-(3,4-dimethylphenyl) - 5 - (3',4' - dimethoxyphenyl) - 3 - aza-pentanol-(1) hydrochloride.* — (a) In this example, 4.62 grams of 1-(2-chloro-1-hydroxyethyl)-3,4-dimethylbenzene, 4.53 grams of (3,4-dimethoxyphenyl)-ethyl amine and 1.46 grams of sodium carbonate were heated at reflux temperature in 60 ml. of a mixture containing equal parts by volume of ethanol and water. Subsequently, the ethanol was removed and the product was taken up in chloroform. The chloroform was then removed and the residue was treated, in methanol, with ethereal hydrogen chloride. The 1.53 grams of 1-(3,4-dimethylphenyl)-5-(3,4-dimethoxyphenyl)-3-aza-pentanol-(1) hydrochloride which separated out of solution in this step was suspended in 2 N hydrochloric acid and recovered by filtration. The product, which was thus obtained, was crystallized two times from isopropanol.

There was obtained by this procedure, 1-(3,4-dimethylphenyl) - 5 - (3',4'-dimethoxyphenyl)-3-aza-pentanol-(1) hydrochloride melting at 159.5° to 161.5° C.

(b) The 1 - (2 - chloro - 1 - hydroxyethyl) - 3,4 - dimethylbenzene which was used as the starting material in the process described in section (a) of this example, was prepared in the following manner: 18.27 grams (0.1 mole) of 1-chloroacetyl-3,4-dimethylbenzene (Kunckell, Ber., 1897, 30, 1713) were dissolved in 400 ml. of boiling dry isopropanol. This solution was treated with a solution of 61.29 grams (0.3 mole) of aluminum isopropoxide in 100 ml. of dry isopropanol. The mixture was heated in an oil bath at a temperature of 120° C. for a period of about 20 minutes. Thereafter, the reaction mixture was poured onto ice and water and, with stirring, made acid by the addition of 75 ml. of hydrochloric acid. The product was then extracted with ether, washed with water, dried and distilled. There was obtained an oil-like product having a boiling point of 114° to 118° C./0.6 mm. This oil was crystallized from petroleum ether (boiling point at 40° to 60° C.) to yield 1 - (2 - chloro - 1 - hydroxyethyl) - 3,4 - dimethylbenzene in the form of long needles of melting point 46° to 49.5° C.

(c) An alternate process for preparing the 1-(2-chloro - 1 - hydroxyethyl) - 3,4 - dimethylbenzene starting material of section (a) of this example is as follows: 146 grams (0.8 mole) of 1-chloroacetyl-3,4-dimethylbenzene in 800 ml. of dioxan and 200 ml. of water were cooled to a temperature of about 50° C. and treated, portionwise, with 26.82 grams (0.2 mole) of potassium borohydride over a period of about 5 hours. During this addition, and for one hour thereafter, the reaction mixture was continuously stirred. At the end of that period of time, the solvent was removed from the reaction mixture under reduced pressure. Thereafter, water was added to the reaction mixture and the product was extracted with ether. Removal of the ether, followed by distillation of the residue, yielded the desired 1-(2-chloro-1-hydroxyethyl)-3,4-dimethylbenzene.

EXAMPLE 2

*Preparation of 1-(3,4-dimethylphenyl)-5-(3',4'-dimethoxyphenyl)-3-aza-pentanol-(1) hydrochloride.*—In this example, 1.82 grams of 1-(3,4-dimethylphenyl)-5-(3',4'-dimethoxyphenyl) - 3 - aza - pentanone - (1) hydrochloride was added to 50 ml. of methanol and reduced therein, using about 2 grams of Raney-nickel catalyst, at a temperature of 20° C. and at atmospheric pressure. After about 170 ml. of hydrogen had been taken up, the catalyst was removed from the reaction mixture by filtration and the filtrate was concentrated and ether added thereto. By this procedure there was obtained 1-(3,4-dimethylphenyl) - 5 - (3',4' - dimethyoxyphenyl) - 3 - aza-pentanol-(1) hydrochloride melting at 160° to 163° C.

The 1 - (3,4 - dimethylphenyl) - 5 - (3,4 - dimethoxyphenyl)-3-aza-pentanone-(1) hydrochloride which was used as the starting material in the process described in the preceding paragraph was prepared in the following manner: 18.27 grams of 1-chloracetyl-3,4-dimethylbenzene was added to 15 ml. of ether and this mixture was treated, at a temperature of about 0° C., with 36.2 grams of (3,4-dimethoxyphenyl)-ethyl amine and 100 ml. of chloroform. The reaction mixture was allowed to stand at a temperature of about 0° C. for a period of about 18 hours. Thereafter, the mixture was filtered to remove any unreacted (3,4-dimethoxyphenyl)-ethyl amine present therein. The filtrate was diluted with 50 ml. of methanol and subsequently treated with etheral hydrogen chloride. There was obtained by this method 1-(3,4-dimethylphenol) - 5 - 3',4' - dimethoxyphenyl) - 3 - aza - pentanone-(1) hydrochloride, melting at 192° to 197° C. Recrystallization of this compound from ethanol yielded the pure hydrochloride salt melting at 197° to 200° C.

EXAMPLE 3

(a) *Preparation of 1 - (3,4-dimethyl) - 5 - 3'.4'-dimethoxyphenyl) - 3 - aza -pentanol - (1) hydrochloride.*—In this example, 19.76 grams of 1-epoxyethyl-3,4-dimethylbenzene, 29 grams of (3,4-dimethoxyphenyl)-ethyl amine and 16 ml. of 2 N sodium hydroxide were shaken together for a period of 4½ days at a temperature of about 20° C. During this period of time, a solid separated out of solution and the liquid was removed by decantation. The solid product, thus obtained, was dissolved in ethanol, following which the ethanol was removed and traces of water were removed from the product by codistillation with chloroform. The resulting base was then treated with ethereal hydrogen chloride and the crude 1-(3,4-dimethylphenyl)-5-(3',4'-dimethoxyphenyl)-3-aza-pentanol-(1) hydrochloride having a melting point of 128° to 132° C. was obtained. The product was suspended in 2 N hydrochloric acid for a period of about two hours, following which it was crystallized from isopropanol to yield pure 1-(3,4-dimethylphenyl)-5 - (3',4' - dimethoxyphenyl) - 3 - aza - pentanol - (1) hydrochloride having a melting point of 159°–161.5° C.

The 1-epoxyethyl-3,4-dimethylbenzene, which was used as the starting material in the process described in the preceding paragraph, was prepared in the following manner: 132.8 grams of 1-(2-chloro-1-hydroxyethyl)-3,4-dimethylbenzene was added to 250 ml. of methanol. This mixture was cooled to a temperature within the range of from about 0° to 5° C. and treated, dropwise over a period of about one hour with 800 ml. of a 1 N solution of methanolic potassium hydroxide. This mixture was stirred for a period of about 5 hours at a temperature of about 20° C., following which it was filtered. The filtrate was evaporated to reduced volume, under reduced pressure, and the desired product was extracted with ether and subsequently distilled. By this method, there was obtained 1-epoxyethyl-3,4-dimethylbenzene boiling point at 90° to 97° C./0.9 mm.; $n_D^{23}$=1.5270.

The following-named compounds were also prepared by the process described herein:

(b) 1-phenyl-5-(3,4-dimethoxyphenyl)-3-aza-pentanol-(1)-hydrochloride, melting point at 157° to 158.5° C.

(c) 1 - (3-methylphenyl)-5-(3,4-dimethoxyphenyl)-3-aza-pentanol-(1) hydrochloride, melting point at 155.5° to 158.5° C.

EXAMPLE 4

(a) *Preparation of 1-(3,4-dimethylphenyl)-5-(3'-methoxy-4'-benzyloxyphenyl)-3-aza-pentanol.*—In this example, 9.88 grams of 1-epoxyethyl-3,4-dimethylbenzene (prepared as described in Example 3), 18.86 grams of (4-benzyloxy-3-methoxyphenyl)-ethyl amine, 15 ml. of ethanol and 8 ml. of 2 N sodium hydroxide solution were vigorously stirred together in an atmosphere of nitrogen for a period of about 140 hours. Thereafter, the ethanol was removed at a temperature of 30° C. under reduced pressure, about 50 ml. of water were added and the mixture was extracted three times with chloroform. The extracts were combined, washed once with water and dried over anhydrous sodium sulfate. The chloroform was evaporated at a temperature of 30° C. under reduced pressure and the resulting syrup was dissolved in ethanol and treated with ethereal hydrogen chloride to yield a crystalline solid of melting point 157° C. to 162° C. The solid was shaken with 100 ml. of water at a temperature of 20° for one hour to remove contaminating (4-benzyloxy-3-methoxyphenyl)-ethyl amine hydrochloride. The insoluble hydrochloride of 1-(3,4-dimethylphenyl)-5-(3'-methoxy-4'-benzyloxy-phenyl)-3-aza-pentanol-(1) was filtered off, dried and recrystallized from ethanol/ether to yield crystalline 1-(3,4-dimethylphenyl)-5-(3'-methoxy-4'-benzyloxyphenyl)-3-aza-pentanol-(1) hydrochloride of melting point 175° to 178° C.

(b) *Preparation of 1-(3,4-dimethylphenyl)-5-(3'-methoxy - 4'-hydroxyphenyl)-3-aza-pentanol-(1) hydrochloride.*—8.84 grams of 1-(3,4-dimethylphenyl)-5-(3'-methoxy-4-benzyloxyphenyl)-3-aza-pentanol-(1) hydrochloride, produced as described in section (a) of this example, were dissolved in 200 ml. of methanol. The solution was hydrogenated at a temperature of 20° and at atmospheric pressure in the presence of 0.4 gram of 5 percent palladium-on-carbon catalyst. After an uptake of 524 ml. of hydrogen had been completed, the catalyst was filtered off, the solution concentrated and ether added, yielding crystalline 1-(3,4-dimethylphenyl)-5-(3'-methoxy-4'-hydroxyphenyl)-3-aza-pentanol-(1) hydrochloride of melting point 166° to 169° C. Recrystallization of the compound from ethanol/ether raiesd the melting point thereof to 167 to 169.5° C.

EXAMPLE 5

(a) *Preparation of 1-(3,4-dimethylphenyl)-5-(3'-benzyloxy-4'-methoxyphenyl)-3-aza-pentanol-(1) hydrochloride.*—4.93 grams of 1-epoxyethyl-3,4-dimethyl-benzene (prepared as described in Example 3), 9.42 grams of (4-benzyloxy-3-methoxyphenyl)-ethyl amine, 10 ml. of ethanol and 4 ml. of 2 N sodium hydroxide solution were vigorously stirred together in an atmosphere of nitrogen for a period of about 200 hours. The ethanol was removed at a temperature of about 30° C. under reduced pressure. Thereafter, about 30 ml. of water were added and the mixture was extracted three times with chloroform. The extracts were combined, washed once with water and dried over anhydrous sodium sulfate. The chloroform was evaporated at a temperature of 30° C. under reduced pressure and the resulting syrup was dissolved in ethanol and treated with ethereal hydrogen chloride. Crystallization was slow, and the first crop (melting point of 142° to 146° C.) consisted of (4-benzyloxy-3-methoxy-phenyl)-ethyl amine hydrochloride. A second crop (melting point of 135° to 142° C.) consisted of 1-(3,4 - dimethylphenyl)-5-(3'-benzyloxy-4'-methoxyphenyl)-3-aza-pentanol-(1) hydrochloride. Recrystallization of the second crop of crystals from ethanol/ether raised the melting point thereof to 146.5° to 148.5° C.

(b) *Preparation of 1-(3,4-dimethylphenyl)-5-(3'-hydroxy-4'-methoxyphenyl)-3-aza-pentanol-(1) hydrochloride.*—1.10 grams of 1-(3,4-dimethylphenyl)-5-(3'-benzyloxy-4'-methoxyphenyl)-3-aza-pentanol-(1) hydrochloride, produced as described in section (a) of this example were dissolved in 25 ml. of methanol. The solution was hydrogenated at a temperature of 20° C. and atmospheric pressure in the presence of 0.05 gram of 5 percent palladium-on-carbon catalyst. After an uptake of 64 ml. of hydrogen had been completed, the catalyst was filtered off. The solution was then concentrated and ether added thereto, yielding crystalline 1-(3,4-dimethylphenyl)-5-(3'-hydroxy - 4'-methoxyphenyl)-3-aza-pentanol-(1) hydrochloride of melting point 165° to 168° C. Recrystallization of the salt from ethanol/ether raised the melting point of the compound to 170° to 171.5° C.

EXAMPLE 6

A pharmaceutical preparation was prepared in the following manner: 10 grams of 1-(3,4-dimethylphenyl)-5-(3,4-dimethoxyphenyl)-3-aza-pentanol-(1) hydrochloride, produced as described in Example 1, were mixed with 159 grams of a granulate of lactose and starch and 5.0 grams of talc and 1.0 gram of magnesium stearate were added thereto. The mixture, which was thus obtained, was subsequently compressed, crushed and recompressed to give tablets weighing 175 mg. and containing 10.0 mg. of the active compound.

We claim:

1. A compound selected from the group consisting of a member of the formula

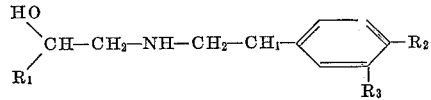

in which $R_1$ is a member selected from the group consisting of phenyl, 3-(lower alkyl)-phenyl, 4-(lower alkyl)-phenyl and 3,4-(di-lower alkyl)-phenyl;

in which $R_2$ is a member selected from the group consisting of hydroxy, methoxy, ethoxy and benzyloxy;

and in which $R_3$ is a member selected from the group consisting of hydroxy, methoxy, ethoxy and benzyloxy;

and salts of such compounds with medicinally acceptable acids.

2. 1 -(3,4 - dimethylphenyl) - 5 - (3',4' - dimethoxyphenyl) - 3 - aza - pentanol - (1).

3. 1 - (3,4 - dimethylphenyl) - 5 - (3', 4' - dimethoxyphenyl) - 3 - aza - pentanol - (1) hydrochloride.

4. 1 - phenyl - 5 - (3,4 - dimethoxyphenyl) - 3 - aza-pentanol - (1).

5. 1 - phenyl - 5 - (3,4 - dimethoxyphenyl) - 3 - aza-pentanol - (1) hydrochloride.

6. 1 - (3 - methylphenyl) - 5 - (3',4' - dimethoxyphenyl) - 3 - aza-pentanol - (1).

7. 1 - (3 - methylphenyl) - 5 - (3',4' - dimethoxyphenyl) - 3 - aza pentanol - (1) hydrochloride.

8. 1 - (3,4 - dimethylphenyl) - 5 - (3' - methoxy - 4'-hydroxyphenyl) - 3 - aza - pentanol - (1).

9. 1 - (3,4 - dimethylphenyl) - 5 - (3' - methoxy - 4'-hydroxyphenyl) - 3 - aza - pentanol - (1) hydrochloride.

10. 1 - (3,4 - dimethylphenyl) - 5 - (3' - hydroxy - 4'-methoxyphenyl) - 3 - aza - pentanol - (1).

11. 1 - (3,4 - dimethylphenyl) - 5 - (3' - hydroxy - 4'-methoxyphenyl) - 3 - aza - pentanol - (1) hydrochloride.

References Cited by the Examiner

UNITED STATES PATENTS

| 2,816,059 | 12/57 | Mills | 260—570.6 X |
| 2,900,415 | 8/59 | Biel | 260—570.6 |
| 3,079,403 | 2/63 | Weinstock. | |
| 3,086,021 | 4/63 | Biel | 167—65 |

FOREIGN PATENTS 789,033  1/58  Great Britain.

OTHER REFERENCES

Allewett et al.: "Journal of Organic Chemistry," vol. 6, pages 384–400 (1941).

CHARLES B. PARKER, *Primary Examiner.*

UNITED STATES PATENT OFFICE
CERTIFICATE OF CORRECTION

Patent No. 3,211,792                            October 12, 1965

John Mervyn Osbond et al

It is hereby certified that error appears in the above numbered patent requiring correction and that the said Letters Patent should read as corrected below.

Column 4, line 51, for "etheral" read -- ethereal --; line 59, for "-3′.4′-", in italics, read -- -(3′,4′- --, in italics; column 5, line 30, for "-pentanol", in italics, read -- -pentanol-(1) --, in italics; line 70, for "raiesd" read -- raised --; column 6, lines 53 to 59, the formula should appear as shown below instead of as in the patent:

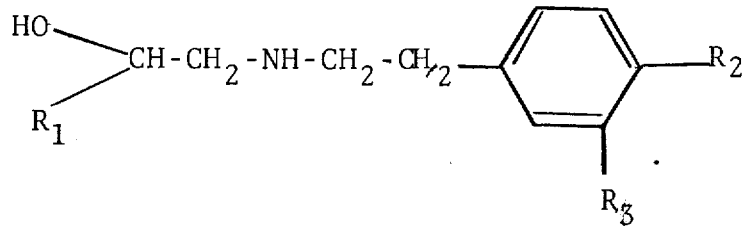

Signed and sealed this 25th day of October 1966.

(SEAL)
Attest:

ERNEST W. SWIDER                                    EDWARD J. BRENNER
Attesting Officer                                Commissioner of Patents